United States Patent
Agrawal et al.

(10) Patent No.: US 10,535,121 B2
(45) Date of Patent: Jan. 14, 2020

(54) CREATION AND RASTERIZATION OF SHAPES USING GEOMETRY, STYLE SETTINGS, OR LOCATION

(71) Applicant: Adobe Inc., San Jose, CA (US)

(72) Inventors: Vivek Agrawal, Noida (IN); Abhishek Singh, Chapel Hill, NC (US)

(73) Assignee: Adobe Inc., San Jose, CA (US)

( * ) Notice: Subject to any disclaimer, the term of this patent is extended or adjusted under 35 U.S.C. 154(b) by 172 days.

(21) Appl. No.: 15/338,952

(22) Filed: Oct. 31, 2016

(65) Prior Publication Data
US 2018/0122050 A1    May 3, 2018

(51) Int. Cl.
G06T 5/00    (2006.01)
G06F 3/0482    (2013.01)
G06T 1/20    (2006.01)

(52) U.S. Cl.
CPC ............ *G06T 5/003* (2013.01); *G06F 3/0482* (2013.01); *G06T 1/20* (2013.01); *G06T 2200/12* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 5,459,828 A * | 10/1995 | Zack | G06K 15/02 345/472 |
| 2008/0030525 A1 | 2/2008 | Ramchandani et al. | |
| 2008/0062204 A1 * | 3/2008 | Ramchandani | G06T 15/503 345/677 |
| 2008/0062205 A1 | 3/2008 | Lyapunov et al. | |
| 2013/0093784 A1 * | 4/2013 | Budhiraja | G06T 5/002 345/611 |
| 2014/0267232 A1 * | 9/2014 | Lum | G06T 17/00 345/419 |

OTHER PUBLICATIONS

Devereux A. "Precision with Every Pixel", [online], [retrieved Jun. 15, 2018], https://blog.readme.io/precision-with-every-pixel, Mar. 2016.*

Wood B. "Working with Basic Shapes in Adobe Illustrator CC (2014 release)", [online], [retrieved Jun. 15, 2018, http://www.adobepress.com/articles/article.asp?p=2253413, Nov. 2014.*

(Continued)

*Primary Examiner* — Kee M Tung
*Assistant Examiner* — Patrick F Valdez
(74) *Attorney, Agent, or Firm* — SMBC

(57) ABSTRACT

A digital medium environment is described to improve creation and rasterization of a shape through pixel alignment. In one example, a pixel alignment system is implemented at least partially in hardware of a computing device. The pixel alignment system receives an input that specifies a geometry, a stroke setting, and a location that serves as a basis to position the shape. The pixel alignment system then snaps the location as specified by the at least one input to a snapped location based on a pixel grid. The snapped location based on the geometry, the stroke setting, and the location as specified by the input. A rasterization module is then employed to rasterize the shape as pixels based on the snapped location.

20 Claims, 10 Drawing Sheets

(56) References Cited

OTHER PUBLICATIONS

"Adobe Illustrator Help and tutorials", [online], [retrieved Mar. 16, 2019], Jan. 2014, https://help.adobe.com/archive/en/illustrator/cc/2013/illustrator reference.pdf, pp. 1-5, 90-94, and 221. (Year: 2014).*
"Combined Search and Examination Report", GB Application No. 1714055.9, Feb. 15, 2018, 7 pages.

* cited by examiner

1000 ⟶

1002
Receive at least one input specifying a geometry, a stroke setting, and a location that serves as a basis to position the shape in the user interface

1004
Snap the location as specified by the at least one input to a snapped location in the user interface based on a pixel grid, the snapped location based on the geometry, the stroke setting, and the location

1006
Rasterize the shape as pixels based on the snapped location

*Fig. 10*

CREATION AND RASTERIZATION OF SHAPES USING GEOMETRY, STYLE SETTINGS, OR LOCATION

BACKGROUND

Content creators often desire to include shapes having sharp, defined edges as part of digital content. When creating an icon of an envelope, for instance, the content creator may draw the edges of envelope using lines that are defined using vectors. These vectors are then rasterized to generate pixels that are used to display the envelope in a user interface.

Conventional techniques used to define the lines as part of rasterization and rendering of the shape, however, may result in blurred and fuzzy edges. This is often due to definition of lines between locations of pixels that are used to rasterize the edges, which causes the edges to blur across additional pixels. For example, a line defined as having a thickness of a single pixel, when located between pixel locations, may result in use of multiple pixels when rasterized that have fading edges that result in the blurring of the line. Although techniques have been developed to address this unwanted effect, these techniques have numerous drawbacks.

In one conventional example, the same style setting is required to be used for each shape (e.g., a line having a single thickness and alignment), which thus limits flexibility of the content creator. In another conventional example, definition of the shape is "broken" in that geometric and line-alignment properties of lines that are used to form the shape are removed. This may result in a shape that is asymmetric, destroy a geometry and dimensions of the shape being created, and limit an ability of the content creator to further modify the shape. Further, these conventional techniques are not usable for shapes having complex geometries such as a polygon, star, and so forth. Thus, these conventional techniques are often avoided as providing an inferior alternative to a shape as having a blurred edge.

SUMMARY

A digital medium environment is described to improve creation and rasterization of a shape through pixel alignment using geometry, style settings, or location. In one example, a pixel alignment system is implemented at least partially in hardware of a computing device. The pixel alignment system receives an input from a shape creation tool of a shape creation system, such as a tool to draw a rectangle, star, polygon, ellipse, or other shape whether simple or complex. The input specifies a geometry, a style setting, and a location that serves as a basis to position the shape in the user interface. The pixel alignment system then snaps the location as specified by the at least one input to a snapped location based on a pixel grid. The snapped location is based on the geometry, the stroke setting, and the location as specified by the input. A rasterizing module is then employed to raster the shape as pixels based on the snapped location, e.g., to convert a vector shape into pixels for rendering.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 10 is a flow diagram depicting a procedure in an example implementation of improved creation and rasterization of shapes using geometry, style settings, or location.

DETAILED DESCRIPTION

Overview

Figure 1:
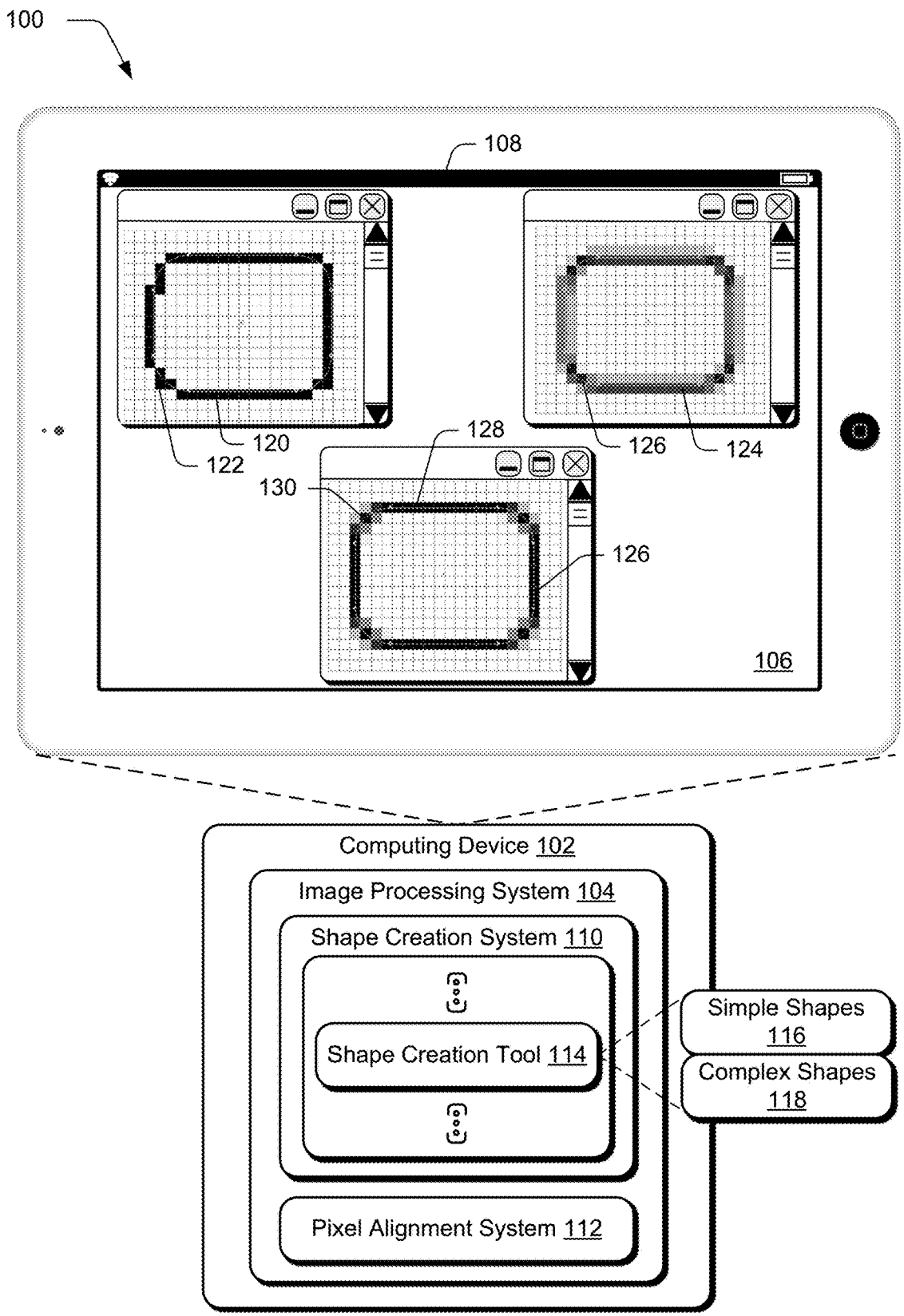
FIG. 1 is an illustration of an environment in an example implementation that is operable to employ improved creation and rasterizing techniques and systems to rasterize shapes using geometry, style settings, or location as described herein.

Techniques and systems are described in a digital medium environment that support the creation and rasterization of shapes having crisp, defined edges. For example, a content creator may interact with a user interface of a shape creation system as implemented by a computing device. The shape creation system includes a plurality of shape creation tools that are usable to draw a variety of simple shapes (e.g., circle, rectangle) or complex shapes (e.g. star, octagon) in the user interface of the computing device. The content creator, for instance, may first select a geometry to be used to form the shape, such as a square, rectangle, circle, star, octagon, and so forth through selection of a representation (e.g., a rectangle) of a corresponding shape creation tool in the user interface, e.g., a rectangle creation tool.

The content creator may also specify style settings for the shape. Style settings include a thickness of a line used to form the shape, how that line is aligned within the user interface (e.g., center, inside, or outside aligned to define a border of the shape), and so forth. To draw the shape, the content creator then specifies locations within the user interface that are used to define a resulting location of the shape.

In one such instance, the shape is defined using a corner-to-corner definition. Therefore, to draw the shape the content creator first provides a user input defining a first corner of the shape (e.g., a corner of the rectangle) at a first location, continues the input (e.g., holding down a button of a mouse or continuing a gesture) and releases it at a second location to define an opposing corner of the shape. Thus, this defines both a location of the shape as a whole within the user interface as well as a size of the shape as part of interaction with the shape creation tool. Likewise, in another such instance a center-to-corner definition is used by a shape creation tool to define a center and corner of the shape which are also used to define an overall location and size of the shape. Regardless of the type of definition used, a size, geometry, and location of the shape in the user interface is then defined by the shape creation tool using vectors based on these locations as having the style settings and corresponding geometry.

In conventional techniques, the geometry is then rasterized to define pixels that are used to render the shape in the user interface. However, as previously described this may cause blurred edges of lines used to form the shape. As also previously described, conventional techniques used to address this blurring have a variety of drawbacks that may make a result of these conventional techniques less desirable than the blurring of the edges.

Accordingly, techniques are described in which a pixel alignment system is configured to snap a definition of the shape to a pixel grid (e.g., pixels and/or subpixels) based on style settings, location, and/or geometry of the shape as created by the shape creation tool. In this way, the pixel alignment system is made aware as to how the shape is defined by the shape creation tool as part of the shape creation system. From this, the pixel alignment system may define the shape for rasterization to have crisp, sharp edges.

To do so, the pixel alignment system receives an input from a shape creation tool. The input specifies a geometry produced by the shape creation tool (e.g., a rectangle) and a style setting used, e.g., thickness and alignment of a line used to form the shape. The input also specifies how the shape is drawn, e.g., following a corner-to-corner definition, a center-to-corner definition, and so forth. The input further specifies at least one location in the user interface that is to serve as a basis for this definition such as a corner or center of the shape.

From this input, the pixel alignment system snaps the location used to define how the shape is drawn to a snapped location of a pixel grid. The pixel grid, for instance, may define pixel and sub-pixel locations that are used to rasterize digital content. By translating the location of the input to a snapped location that corresponds to the pixel grid, the pixel alignment system defines portions of the shape to follow this grid and as a result have crisp, defined edges when rasterized, i.e., when formed into pixels. In the techniques described herein, this snapped location is based on the location, geometry, and style settings.

For example, suppose a content creator selects a line tool to draw a horizontal line with a centered-stroke having a width of a single pixel as part of digital content within a user interface. As a result, the pixel alignment system obtains an input specifying the style settings (e.g., width and alignment) and geometry (e.g., line). The pixel alignment system also receives information via the input that specifies that the line tool draws from corner-to-corner. Based on this input, the pixel alignment system snaps a location used to define the line in the user interface as specified by the content creator to a snapped location definable using sub-pixels in the pixel grid. This causes the line, when rasterized and rendered by the computing device, to have defined, crisp edges because the definition of the snapped location of the line corresponds to alignment of the pixels and sub-pixels in the pixel grid that are to be used to rasterize the line.

Conventional techniques, on the other hand, that are used to a definition of a shape (e.g., vector) within a digital image are not made aware of the style-setting or geometry used by the shape creation tools as part of the shape creation system, nor of how the shape is defined as drawn. Hence, these conventional techniques are not capable of resulting in a crisp shape without distorting a geometry of the shape, without restricting the content creator from modifying style settings, or without breaking stroke alignment and geometries used to define the shape as previously described in the Background section. Further discussion of these and other examples is included in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ improved creation and rasterization techniques for shapes using geometry, style settings, or location described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business.

The computing device 102 is illustrated as including an image processing system 104. The image processing system 104 is implemented at least partially in hardware of the computing device 102 (e.g., using a processing system and computer-readable storage media) to process and transform a digital image in a user interface 106 of a display device 108. Such processing includes creation of the digital image, modification of the digital image, rasterization of the digital image, and rendering of the digital image for output and display by the display device 108. Although illustrated as implemented locally at the computing device 102, functionality of the image processing system 104 may also be implemented as whole or part via functionality available via a network, such as part of a web service or "in the cloud" as further described in relation to FIG. 11.

An example of functionality incorporated by the image processing system 104 to process the digital image 106 is illustrated as a shape creation system 110 and a pixel alignment system 112. The shape creation system 110 is implemented at least partially in hardware (e.g., processing system and computer-readable storage media) of the computing device 104 to draw shapes (e.g., vector shapes) in a user interface as specified using user inputs. The shape creation system 110, for instance, includes a plurality of shape creation tools 114 that are configured to draw corresponding shapes, including simple shapes 116 (e.g., circles, rectangles) and complex shapes 118 (e.g., octagons, stars).

A user, for instance, may select a representation in a user interface of a desired shape to be drawn, selection of which launches a corresponding shape creation tool 114 to draw that shape as having a corresponding geometry. As part of this, the user may also specify style settings (e.g., line thickness and alignment) and locations within the user interface that serve as a basis to define a size and location of the shape in the user interface.

The pixel alignment system 112 is implemented at least partially in hardware of the computing device 104 (e.g., processing system and computer-readable storage media) to cause rasterization of shapes created by the shape creation tool 114 to have defined, crisp edges. With the proliferation of mobile devices, the proximity between a user and a display device 106 and as a result the user has greater awareness of small details regarding what is being displayed by the display device 108. Consequently, vector shapes are commonly used by content creators as these shapes are easy to define and edit later. When rasterizing the vector shape, anti-aliasing is typically employed to soften jagged edges. However, if overused, the antialiasing may be problematic in that a rasterized version of the shape may become blurred.

For example, a first shape 120 as a rounded rectangle, when rasterized without anti-aliasing, includes portions having crisp lines and also curved portions 122 that appear jagged. A second shape 124, which is also a rounded rectangle, when rasterized with conventional anti-aliasing techniques removes the jaggedness of the curved portions 126, but also result in lines that appear blurry. A third shape 128, however, that is rasterized through use of the pixel alignment system 112 results in pixel-aligned edges 128 (e.g., axial lines of a geometry of the shape that are horizontal or vertical) that are crisp and defined. Further, the third shape 128 also permits anti-aliasing that is limited to curved portions of the shape 130 and thus also limits a jagged appearance of the shape. An example of operation of the pixel alignment system 112 is described as follows and shown in a corresponding figure.

Figure 2:
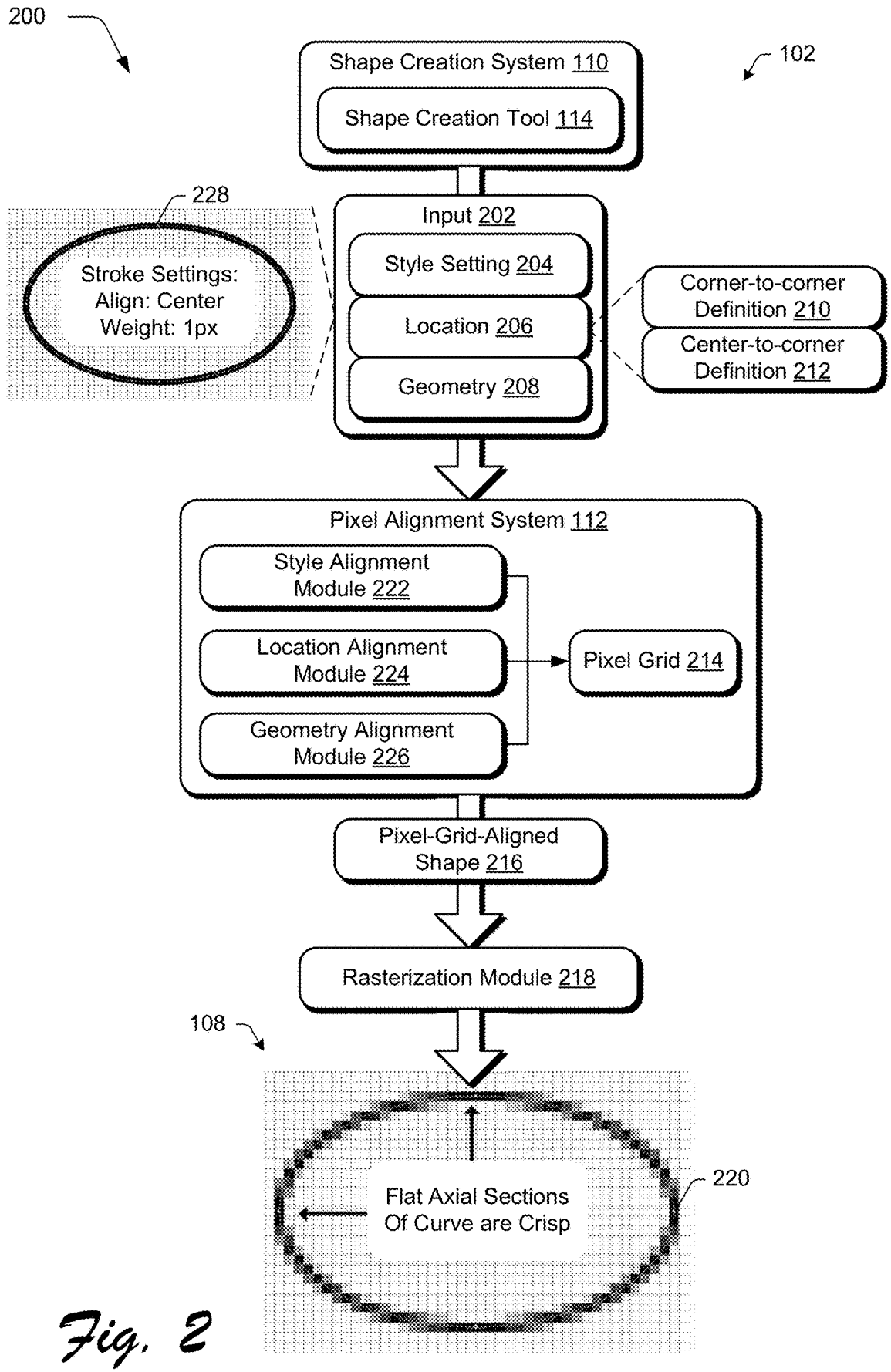
FIG. 2 depicts a system in an example implementation showing operation of a pixel alignment system of FIG. 1 in greater detail.

FIG. 2 depicts a system 200 in an example implementation showing operation of the pixel alignment system 112 of FIG. 1 in greater detail. To begin, a content creator interacts with a shape creation tool 114 of a shape creation system 110 to define (i.e., draw) a shape in a user interface, such as a vector shape including a rectangle, square, polygon, star, and so forth. An example of this is illustrated as an ellipse 228. From this, the pixel alignment system 112 pre-processes the definition of the shape before it is rendered in a user interface of the display device 108 such that the defined shape has edges that appear crisp and not blurred. Further, this preprocessing may be performed in real time to provide an output in real time as the shape is drawn in the user interface.

To do so, the pixel alignment system 112 receives an input from the shape creation system 110 defining how the shape is drawn by the shape creation tool 114. This includes a style setting 204 (e.g., thickness and alignment of a line used to form the shape), a location 206 used to define a location and size of the shape, and a geometry 208 of the shape. The location 206, for instance, may be used as part of a corner-to-corner definition 210. Therefore, to draw the shape the content creator first provides a user input defining a first corner of the shape (e.g., a corner of the rectangle) at a first location, continues the input (e.g., holding down a button of a mouse or continuing a gesture) and releases it at a second location to define an opposing corner of the shape. Thus, this defines both a location of the shape as a whole within the user interface as well as a size of the shape. Accordingly, the location 206 as defined in the input 202 may specify the corners of the shape as further described in relation to FIG. 6. Likewise, in another such instance a center-to-corner definition 212 is used to define a center and corner of the shape. Thus, in this instance the location 206 corresponds to a center or corner of the shape which are also used to define an overall location and size of the shape as further described in relation to FIG. 7.

Based on this input 202, the pixel alignment system 112 aligns the shape to a pixel grid 214 to generate a pixel-grid-aligned shape 216. The pixel-grid-aligned shape 216, when rasterized (e.g., formed into pixels) results a shape 220 for display that has crisp, defined edges, e.g., for axial edges of the shape while permitting anti-aliasing for curved portions of the shape. To do so, the pixel alignment system 112 snaps the location 206 as specified by the input 202 that is used to define locations of the axial edges of the shape to a corresponding pixel location or sub-pixel location of the pixel grid 214 that causes alignment of these edges with the pixel grid 214 as further described as follows.

Figure 3:
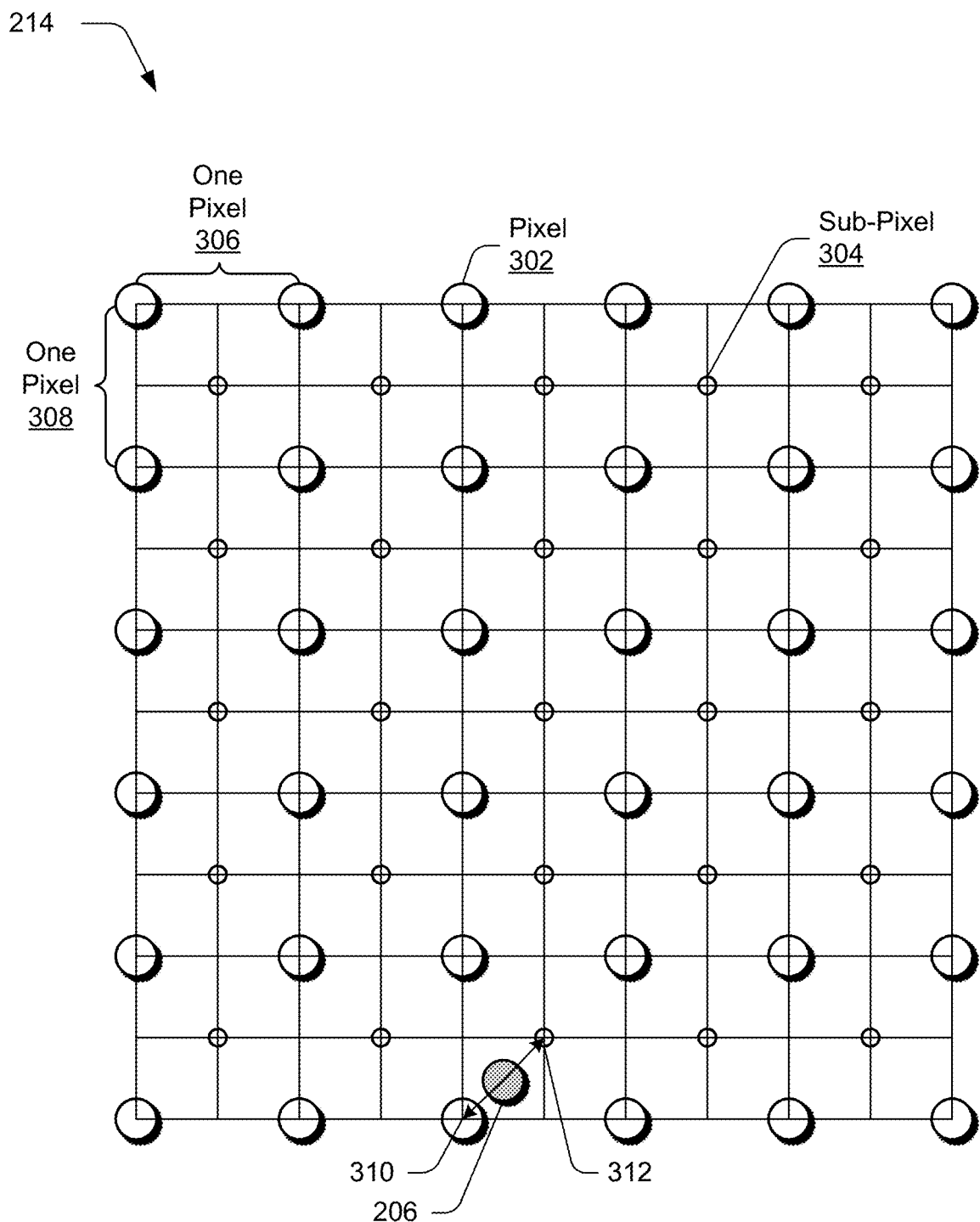
FIG. 3 depicts an example implementation showing a pixel grid of FIG. 2 in greater detail as used to snap a location of an input for alignment to pixel or sub-pixel locations of the pixel grid.

FIG. 3 depicts an example implementation showing the pixel grid 214 of FIG. 2 in greater detail as used to snap the location 206 of the input for alignment to pixel or sub-pixel locations of the pixel grid 214. The pixel grid 214 in this example is formed as a square grid including pixel 302 locations used to rasterize digital content and sub-pixel 304 locations that are offset from the pixel locations by a distance of half of a pixel in both vertical and horizontal. Thus, the pixel 302 locations are spaced apart from other pixels in the pixel grid by a unit of one pixel 306, 308 in both the vertical and horizontal directions. Likewise, the sub-pixel 304 locations are also spaced apart from other sub-pixel locations by a unit of one pixel in both vertical and horizontal directions, which are offset from the pixel 302 locations. Other configurations of a pixel grid 214 are also contemplated, including non-square configurations.

In the illustrated example, a location 206 is received as part of the input 202 by the pixel alignment system 112 that is to be used as a basis to define where and at what size the shape is to assume in the user interface. The pixel alignment system 112, in response to this location 206, snaps the location 206 to a pixel 310 location or a sub-pixel 312 location within the pixel grid 214, i.e., a snapped location. This snapped location causes the shape, when rasterized by the computing device 102, to have defined, crisp edges for lines used to form the shape (i.e., axial edges of the shape that follow horizontal or vertical axes of the pixel grid 214) through alignment of the lines with the pixels within the grid. To do so, the pixel alignment system 112 leverages knowledge of a geometry used to form the shape, style setting used for lines of the shape, and a definition of how the shape is drawn using a shape creation tool 114.

Returning again to FIG. 2, the pixel alignment system 112 includes a style alignment module 222, a location alignment module 224, and a geometry alignment module 226 that are implemented at least partially in hardware of the computing device 102 to align the shape as specified by the input 202 to the pixel grid 214. The style alignment module 222, for instance, is representative of functionality of the computing device 102 as part of the pixel alignment system 112 to address style settings 204 used to define the line that forms the shape as part of fitting the shape to the pixel grid 214. Further discussion of operation of the style alignment module 222 is described in relation to FIGS. 4 and 5 in the following description.

The location alignment module 224 is representative of functionality of the computing device 102 as part of the pixel alignment system 112 to address location 206 of a user input that is to serve as a basis of where the shape is located in the digital content and even a size of the shape. The location alignment module 224, for instance, may address whether a corner-to-corner definition 210 or a center-to-corner definition 212 is employed by the shape creation tool 114 to draw the shape. Further discussion of operation of the location alignment module 224 is described in relation to FIGS. 6 and 7 in the following description.

The geometry alignment module 226 is representative of functionality of the computing device 102 as part of the pixel alignment system 112 to address geometry 208 of the shape being drawn. The geometry alignment module 226, for instance, may snap the location 206 defining a center of the shape and a location 206 defining a corner of the shape in such a way that top and bottom axial edges of the lines used to form the shape lie on pixel 302 or sub-pixel 304 locations. As a result, rasterization and rendering of the shape results in crisp, defined edges of lines used to form the axial edges of the shape in vertical or horizontal directions. Further, anti-aliasing may be permitted for curved portions of the shape, and thus limit a jagged appearance for curved portions or diagonal lines that do not follow the vertical or horizontal axes of the pixel grid 214. Further discussion of operation of the geometry alignment module 226 is described in relation to FIG. 8 in the following description.

Through awareness of the geometry 208 being drawn, the style settings 204 used to define lines of the shape, and location 206 and definitions of how the drawing of the shape is performed by the shape creation tool 114, the pixel alignment system 112 may translate one or more of the locations 206 used to define the shape to snapped locations. These snapped locations cause lines of the shape (e.g., vertical or horizontal axial edges), when rasterized, to become pixel perfect (i.e., perfectly anti-aliased) shapes as further described in relation to the following examples.

Figure 4:
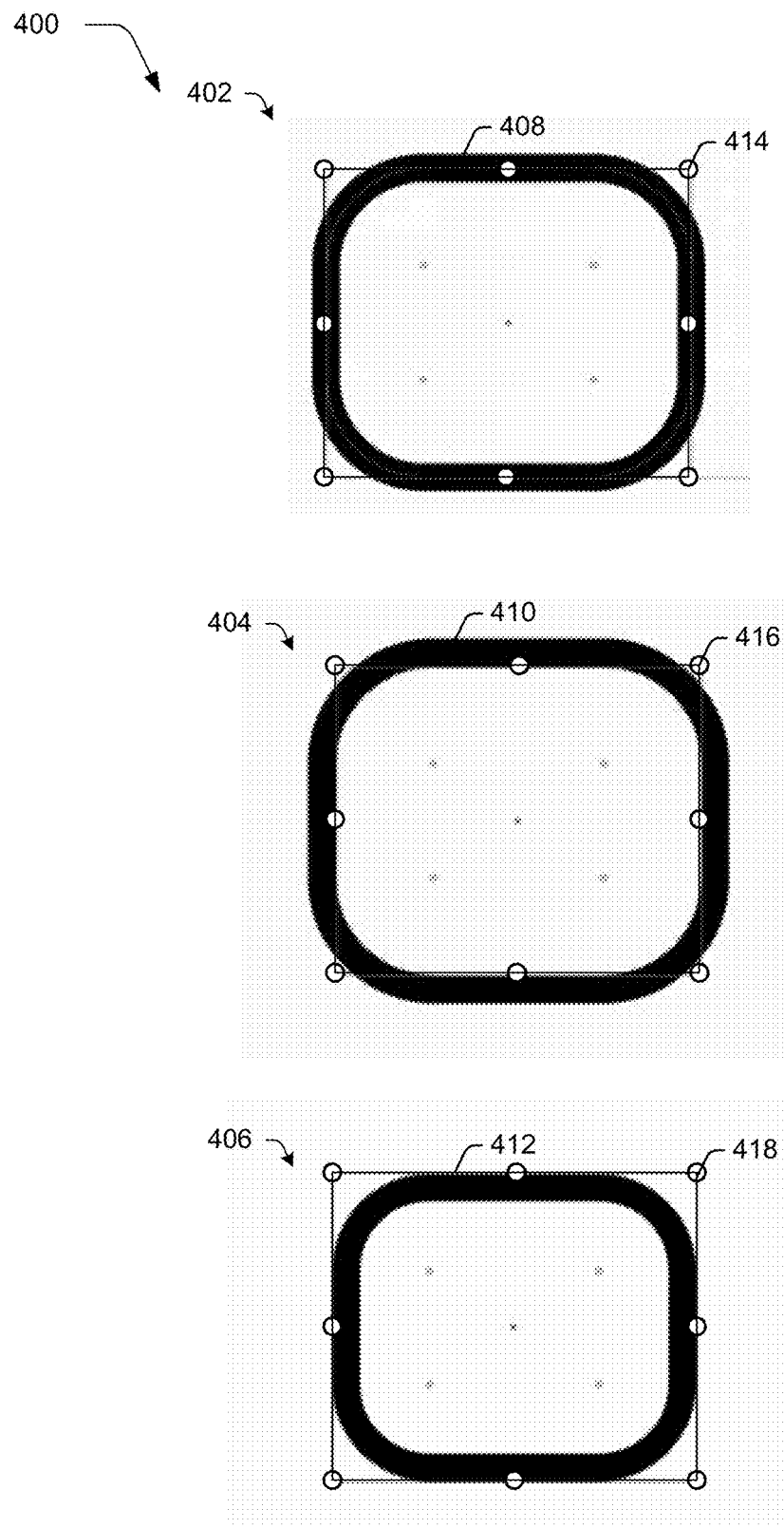
FIG. 4 depicts an example implementation in which a style alignment module of FIG. 2 is employed to align a shape to a pixel grid based on a style setting specifying alignment of a line that forms the shape.

FIG. 4 depicts an example implementation 400 in which the style alignment module 222 aligns the shape to the pixel grid 214 based on a style setting 204 specifying alignment of a line. The style alignment module 222 in configured to take into account style settings 204 to determine a snapped location to be used to define location of the shape within the user interface. In this example, the style settings include stroke settings that define a thickness and alignment of a line (i.e., stroke) used to form the lines of the shape. Other style settings may also be taken into account by the style alignment module 222, such as effects, fill, and so forth.

Three examples 402, 404, 406 are illustrated of vector shapes 408, 410, 412 formed as rectangles having rounded edges. In the first example 402, the vector shape 408 is center-aligned in relation to a geometry 414 used to define the shape. In the second example 404, the vector shape 410 is inside aligned in relation to a geometry 416 used to define the shape. In the third example 406, the vector shape 412 is outside aligned in relation to a geometry 418 used to define the shape. This alignment is taken into account by the style alignment module 222 as further described in the following rules.

For an axial straight line (or curve with an axial normal), the following rules are applied by the style alignment module 222 to determine a snapped location for the shape:

For an inside-aligned line, snap to pixel 302 locations in the pixel grid 214 and not sub-pixel 304 locations;

For an outside-aligned line, snap to pixel 302 locations in the pixel grid 214 and not sub-pixel 304 locations;

For a center-aligned, even-pixel-weighted line, snap to pixel 302 locations in the pixel grid 214 and not sub-pixel 304 locations; and For a center-aligned, odd-pixel-weighted line, snap to sub-pixel 304 locations and not pixel 302 locations in the pixel grid 214.

Following these rules, the style alignment module 222 may snap a location used to define placement of the shape according to the pixel grid 214. This snapped location may be based both on the alignment of the line as well as thickness of the line as further described in the following description and shown in a corresponding figure.

Figure 5:
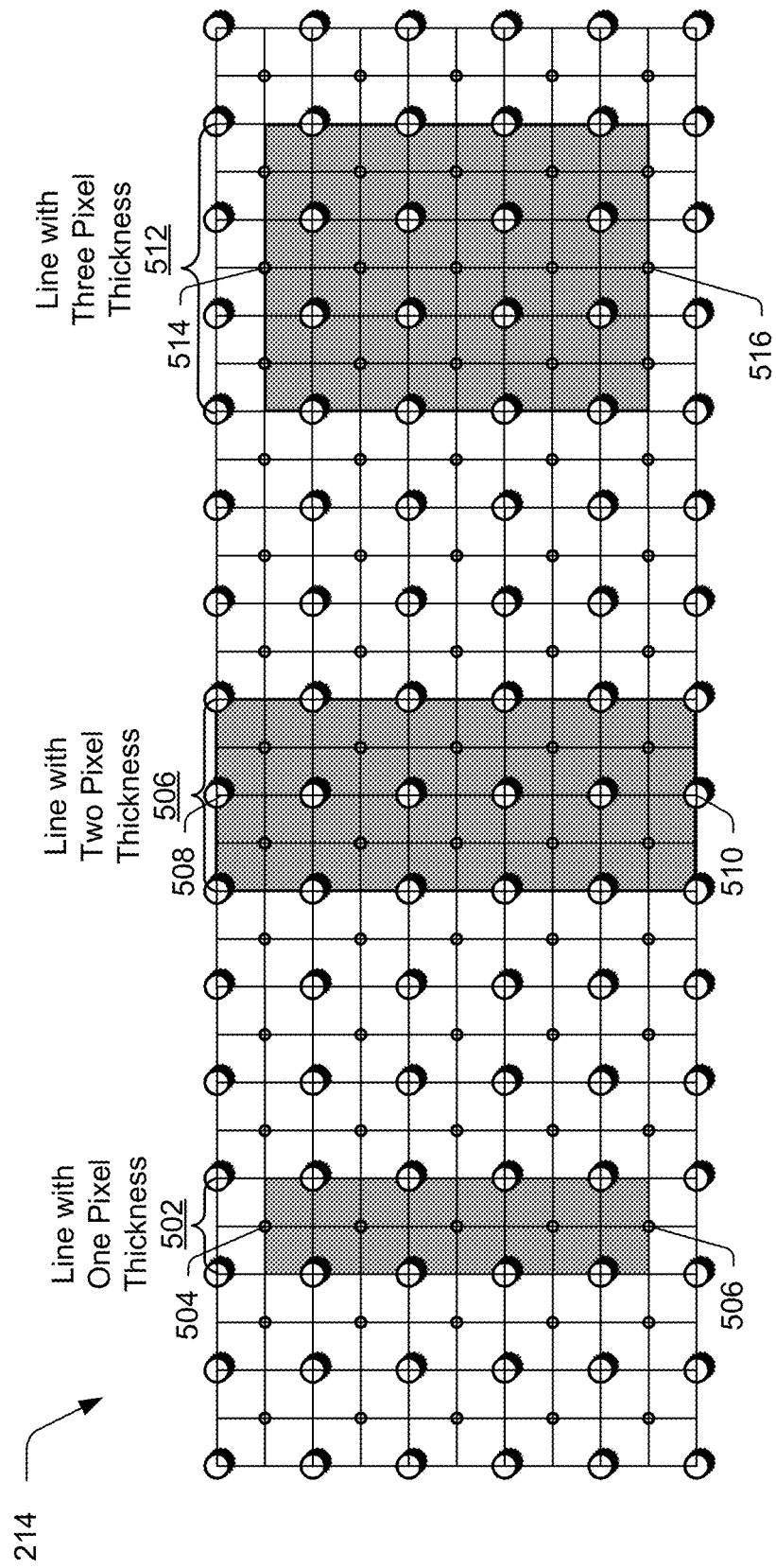
FIG. 5 depicts an example implementation in which a style alignment module of FIG. 2 aligns a shape to a pixel grid based on a style setting specifying thickness of a line used to form the shape.

FIG. 5 depicts an example implementation 500 in which the style alignment module 222 aligns the shape to the pixel grid 214 based on a style setting 204 specifying thickness of a line used to form the shape. Each of the lines in this example are center aligned, as inside or outside aligned lines are snapped to pixel 302 locations as defined by the above rules. For odd-weighted-pixel lines having a thickness defined using an odd number of pixels (e.g., 1, 3, 5, etc.), the snapping uses sub-pixel 304 locations of the pixel grid 214.

As shown for the line with a single pixel thickness 502, for instance, the snapped locations 504, 506 use sub-pixel 304 locations within the pixel grid 214. For a line with a two-pixel thickness 506, on the other hand, the snapped locations 508, 510 are limited to pixel 302 locations and are restricted from use of sub-pixel 304 locations within the pixel grid 214. For a line with a three-pixel thickness 512, this line has an odd pixel weight and thus permits use of sub-pixel 304 locations for snapped locations 514, 516 that define a size and location, at which, the shape (e.g., line) is to be rasterized and then rendered in a user interface. By doing so, the shape is configured to include crisp, defined edges to the extent possible as supported by the display device 108 by following alignment of the pixel grid 214.

Figure 6:
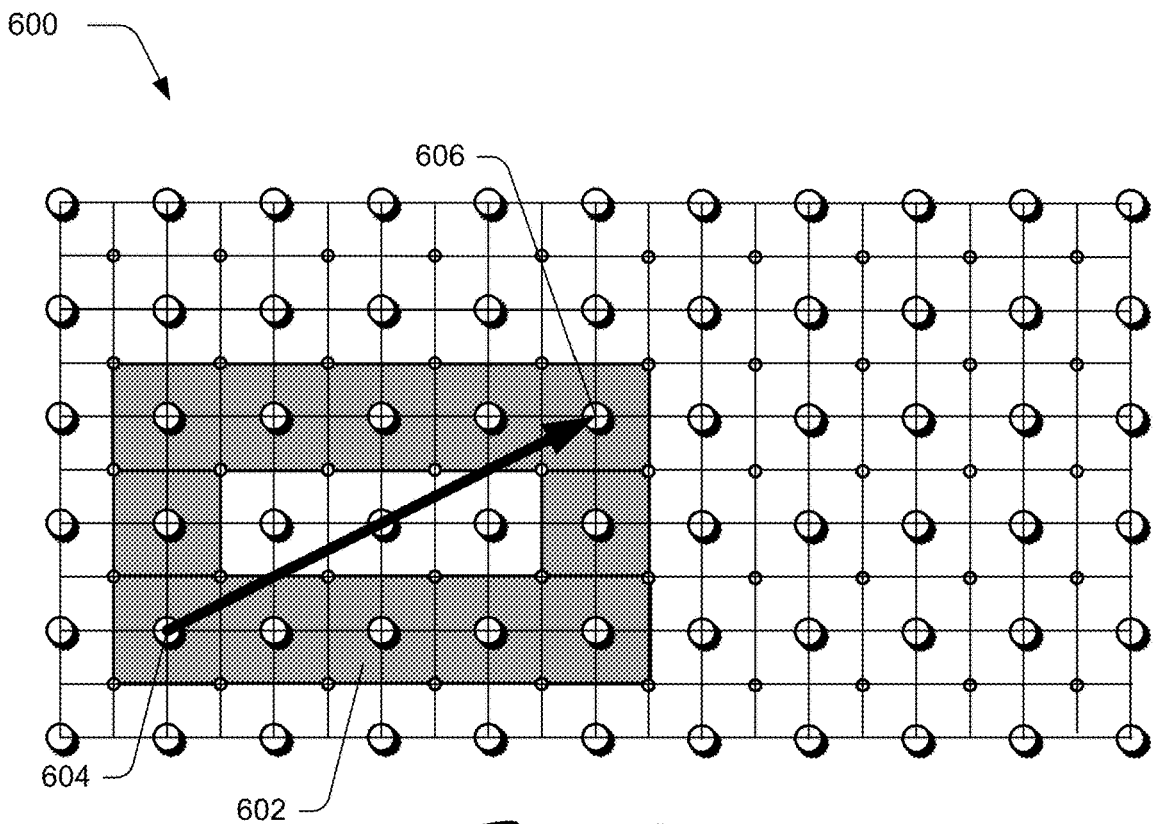
FIG. 6 depicts an example implementation in which a location alignment module of FIG. 2 aligns a shape to a pixel grid based on a corner-to-corner definition regarding how the shape is drawn by a shape creation tool of a shape creation system.

FIG. 6 depicts an example implementation 600 in which the location alignment module 224 aligns the shape to the pixel grid 214 based on a corner-to-corner definition 212 regarding how the shape is drawn by the shape creation tool 114 of the shape creation system 110. In this example, the inputs 202 received by the location alignment module 224 are used to specify how a shape is drawn by the shape creation system 110, e.g., by a particular shape creation tool 114. As part of this, the input 202 includes a location 206 specifying a location of a shape 602 as a whole in a user interface as well as how that shape is defined. In this example, a corner-to-corner definition 212 is employed. As such, the locations 206 defined as part of the input 202 define locations of these corners.

The location alignment module 224, thus, is made aware via the input that the locations 206 that define the corners are to be snapped to maintain pixel-perfectness such that axial edges of the shape lie on pixel or sub-pixel locations. To do so, the rules described in relation to FIGS. 4 and 5 regarding style settings are followed as performed by the style alignment module 222. The location alignment module 224 is then used to determine snapped locations 604, 606 of the corners of the shape 602.

A user input, for instance, may indicate a corner via a location 206 specified by an input 202 that is then relocated to the snapped location 604. The user input may then continue as indicated by the arrow to a second location, which is then used to generate a snapped location 606 for a second corner of the shape 602. This may be performed as part of preprocessing, rasterization, and rendering in real time such that the shape 602 is continually snapped during receipt of the input 202. This may also take into account geometry 208 to promote location of lines that form the shape as aligned with the pixel grid, an example of which is further described in relation to FIG. 8.

Figure 7:
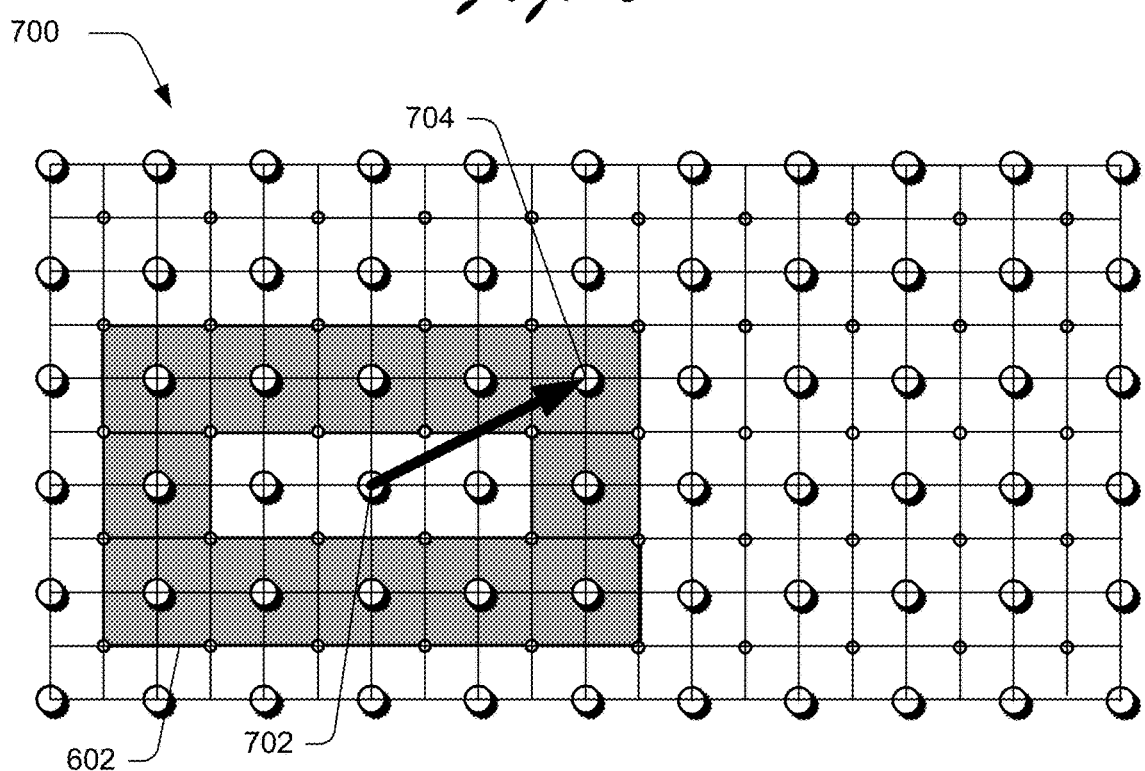
FIG. 7 depicts an example implementation in which a location alignment module of FIG. 2 aligns a shape to a pixel grid based on a center-to-corner definition regarding how the shape is drawn by a shape creation tool of a shape creation system.

FIG. 7 depicts an example implementation 700 in which the location alignment module 224 aligns the shape to the pixel grid 214 based on a center-to-corner definition 214 regarding how the shape is drawn by the shape creation tool 114 of the shape creation system 110. As before, the location alignment module 224 is then used to determine snapped locations 702, 704.

In this instance, however, snapped location 702 corresponds to a center of the shape 602. The corner of the shape 602 is then defined via a second snapped location 704 as a radius of the shape 602. Thus, the center snapped location 702 is not directly associated with any edge of the shape 702. However, the snapped location 702 does define the shape 602 to have axial edges that are crisp as part of this aligned through pixel symmetry. Pixel symmetry means that pixels occupied by a top edge (or left edge) of the shape 602 form a mirror image of pixels occupied by an opposing edge, e.g., a bottom edge (or right edge) about an axis to defined using a horizontal or vertical line passing through a center of the shape 602.

This may also be performed as part of preprocessing, rasterization, and rendering in real time such that the shape 602 is continually snapped during receipt of the input 202. This may also take into account geometry 208 to promote location of lines that form the shape as aligned with the pixel grid, an example of which is further described as follows and is shown in a corresponding figure.

Figure 8:
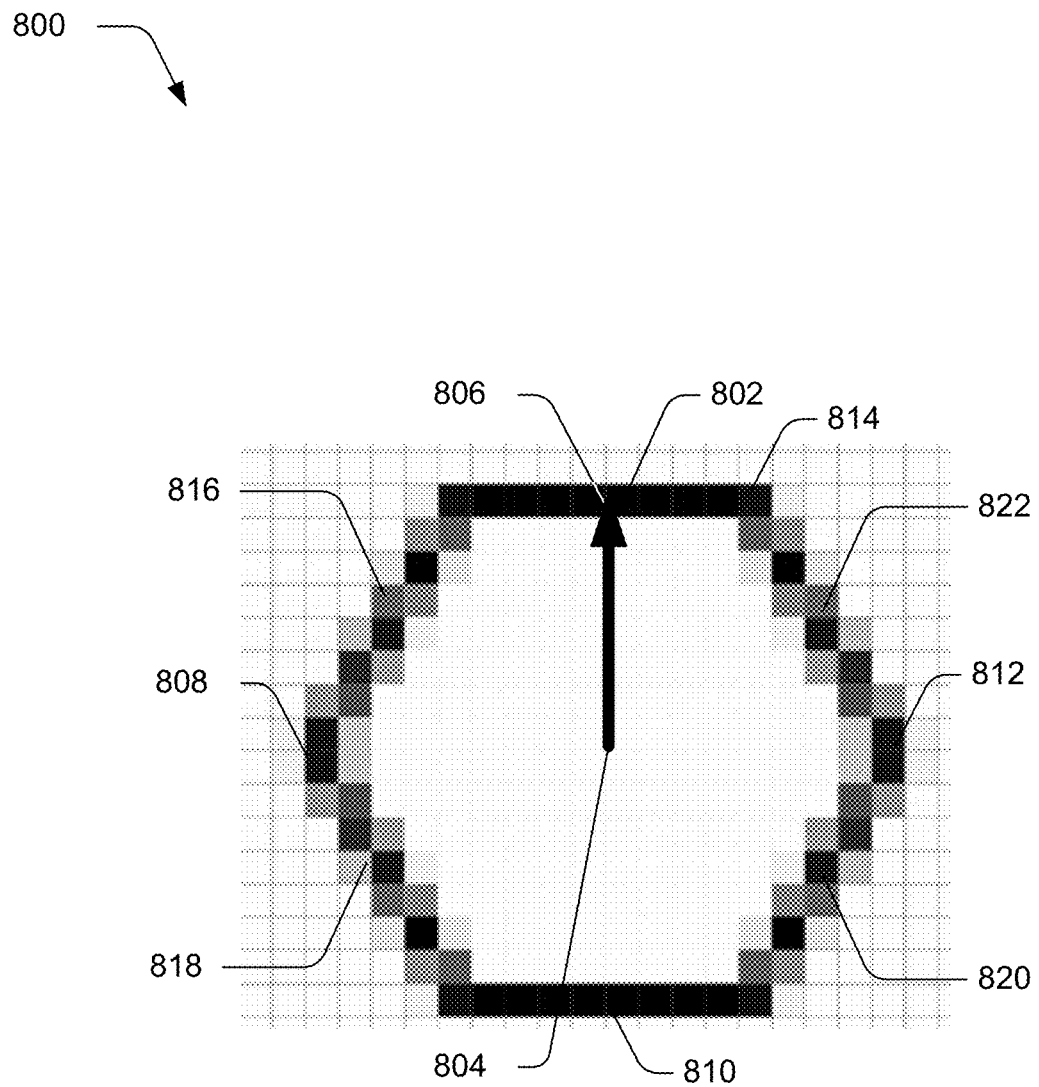
FIG. 8 depicts an example implementation in which a geometry alignment module of FIG. 2 aligns a shape to a pixel grid based on a geometry of the shape as defined in an input received from a shape creation tool of a shape creation system.

FIG. 8 depicts an example implementation 800 in which the geometry alignment module 226 of FIG. 2 aligns portions of the shape to the pixel grid 214 based on a geometry 208 of the shape as defined in the input 202 received from the shape creation tool 114 of the shape creation system 110. The geometry alignment module 226 may employ a variety of different techniques to align lines (e.g., axial lines) used to form the shape to the pixel grid 214 to achieve a pixel perfect shape along horizontal or vertical portions of the shape. Portions of the shape that do not follow horizontal or vertical axes of the pixel grid 214 may employ anti-aliasing to support smooth and non-jagged edges.

In a first example, a simple shape 116 geometry 208 is received by the geometry alignment module 226, such as for a rectangle, ellipse, rectangle, rounded rectangle, and so on. Based on the style settings 204 as processed by the style alignment module 222, the rules are applied directly to corners of the shape regardless of whether the shape employs a corner-to-corner definition 210 or a center-to-corner definition 212. For a corner-to-corner definition, for instance, this results in application of these rules, automatically, to associated edges of the shape. This is because if a corner "x" of a simple shape lies on a sub-pixel 304 location, then the edges associated with it must also lie on the sub-pixel locations. This causes an intersection at "x." This also applies if "x" lies on a pixel 302 location or if a center-to-corner definition 212 is utilized.

In a second example, a center-to-corner definition 212 is applied to a complex shape 118 geometry 208, such as a star or polygon. An example of a complex shape 802 is illustrated in FIG. 8. This complex shape 802 follows a center-to-corner definition 210 using first and second snapped locations 804, 806, which are generated as follows.

For these cases, the example rules used by the style alignment module 222 are not directly applicable in some instances. Accordingly, the geometry alignment module 226 may determine the snapped locations 804, 806 for which the geometry 208 remains intact. This causes axial lines 808, 810, 812, 814 of the shape 802 that correspond to vertical or horizontal axes of the pixel grid 214 to follow the rules of the style alignment module 222 and thus are pixel perfect. Axial lines 816, 818, 820, 822 (e.g., curved or straight) that do not correspond to vertical or horizontal axes of the pixel grid 214 are permitted to employ anti-aliasing, thereby removing undesirable jaggedness from these portions of the shape as illustrated. Additional examples are illustrated in FIG. 9.

An example of such a calculation is described in the following pseudocode: FIX_POLYGON(P)

/*P=an upright regular polygon input by the user, P.n=number of sides of P,
P.r=radius of the P, P.a=interior angle of P, P.c=center of polygon*/
Point p1:=P.c+<0.0, P.r*sin(a/2.0)>
Point p2:=snap p1 to nearest pixel 302 or sub-pixel 304 location in the pixel grid 214 depending on a style setting 204 of the polygon P
P.r:=(p2.y−center.y)/sin(a/2.0) # geometry of P is modified to make it pixel perfect This same calculation is also applicable to upright stars with axial edges. As more shapes and vector appearances are added, customized geometric constraints may also be added to the geometry alignment module 226 using the rules of the style alignment module 222.

Figure 9:
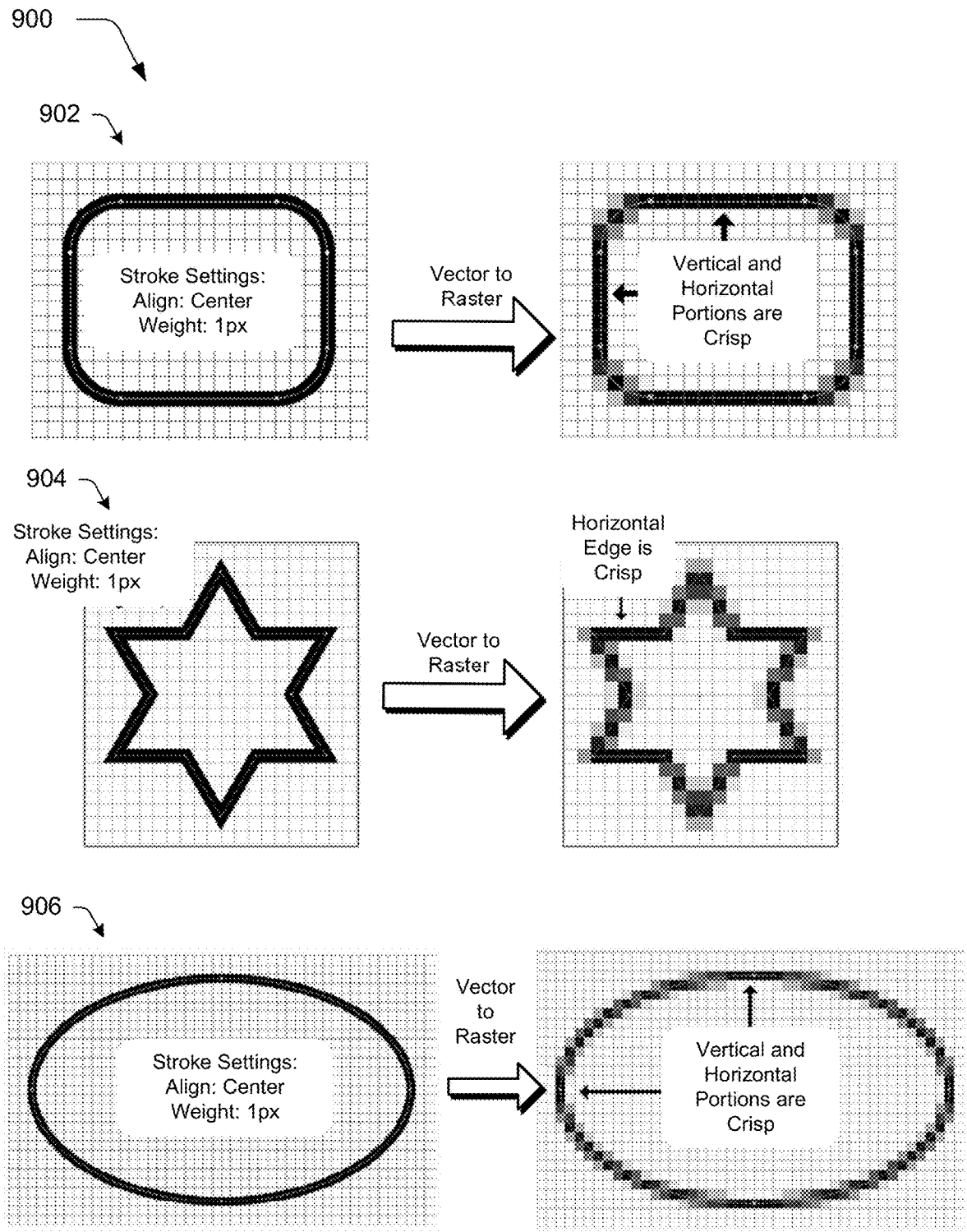
FIG. 9 depicts additional example implementations of rasterizing vector shapes through use of the pixel alignment system of FIG. 1.

FIG. 9 depicts additional example implementations 900 of rasterizing vector shapes through use of the pixel alignment system 112. In a first example 902, a vector shape of a rectangle having rounded corners is rasterized such the vertical and horizontal portions of the shape are crisp yet other curved portions permit anti-aliasing to promote an appearance of smooth and not jagged edges. In a second example 904, a vector shape of a star is shown that is formed from straight lines. The straight lines that follow vertical and horizontal axes of the pixel grid are crisp yet other straight lines permit anti-aliasing to promote an appearance of smooth and not jagged edges. In a third example 906, a vector shape of an ellipse is shown that is formed from a curved line. Vertical and horizontal portions of the curved line that follow the pixel grid are crisp yet other curved portions permit anti-aliasing to achieve a smooth and non-jagged appearance. Other examples are also contemplated.

Through use of the style alignment module 222, location alignment module 224, and geometry alignment module 226, the pixel alignment system 112 supports a variety of functionality that is not available using conventional techniques. Through awareness of style settings 206, the pixel alignment system 112 does not limit a content creator to a limited number of settings unlike conventional techniques. Further, through awareness of geometry 208, the pixel alignment system 112 may generate the snapped locations as part of preprocessing, as opposed to post-processing of conventional techniques that broke geometric definitions of the shapes or detached the appearance of a shape spline. The pixel alignment system 112, through use of the techniques above, permits a content creator to use whichever shape creation tool and whatever style setting to create pixel perfect shapes, thus taking away the inconvenience involved in manual editing of the shapes afterward to achieve this. These techniques supported by the pixel alignment system 112 are non-disruptive, non-intrusive (does not require use of particular style settings 204), and non-destructive.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-9.

FIG. 10 depicts a procedure 1000 in an example implementation of improved creation and rasterization of shapes using geometry, style settings, or location. At least one input is received specifying a geometry, a stroke setting, and a location that serves as a basis to position the shape in the user interface (block 1002). The pixel alignment system 112, for instance, receives an input 202 from a shape creation tool 114 of a shape creation system 110, such as a tool to draw a rectangle, star, polygon, ellipse, or other shape whether simple or complex. The input 202 specifies a geometry 208, a style setting 204, and a location 206 that serves as a basis to position the shape in the user interface The location as specified by the at least one input is snapped to a snapped location in the user interface based on a pixel grid. The snapped location is based on the geometry, the stroke setting, and the location (block 1004). Continuing with the previous example, the pixel alignment system 112 then snaps the location 206 as specified by the at least one input to a snapped location in the user interface based on a pixel grid 214. The snapped location is based on the geometry 208, the style setting 204, and the location 206 as specified by the input, e.g., through use of a style alignment module 222, location alignment module 224, and/or geometry alignment module 226 as previously described.

The shape is rasterized based on the snapped location (block 1006). For example, a rasterization module 218 is employed to rasterize the pixel-grid-aligned shape 216 into pixels. The pixels are then rendered for viewing on a display device 108. A variety of other examples are also contemplated as described above.

Example System and Device

Figure 11:
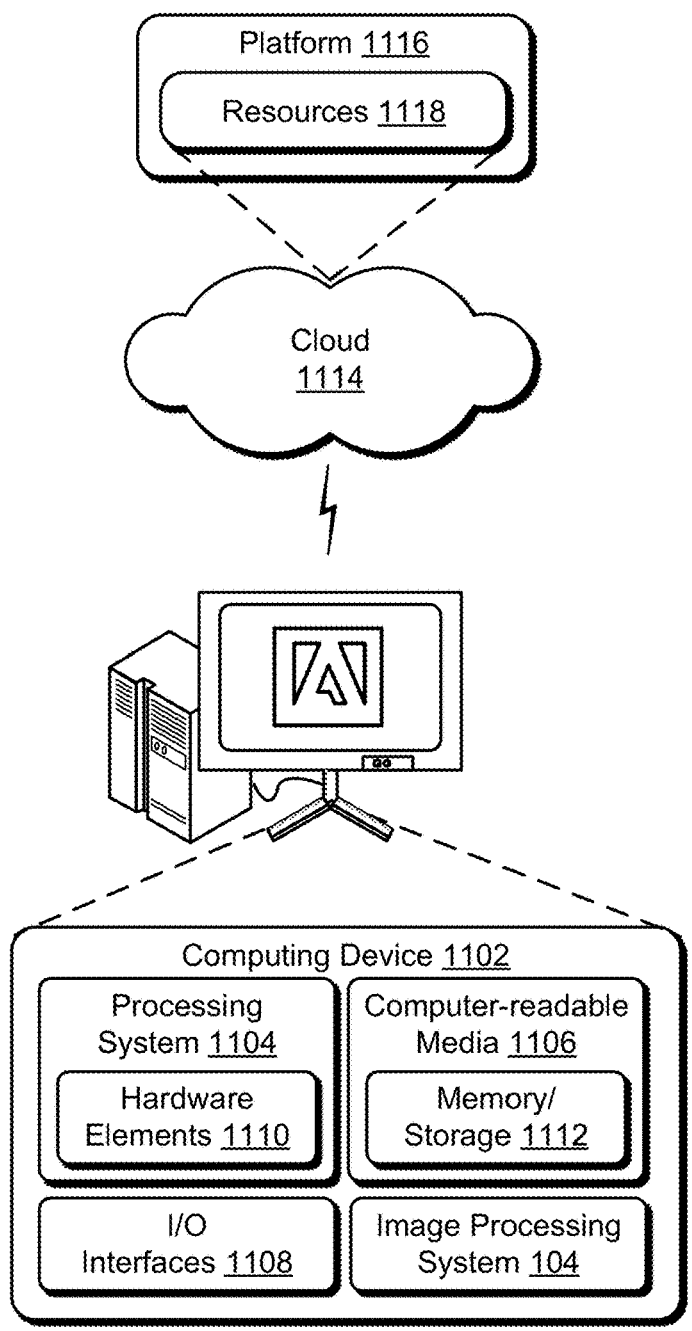
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the image processing system 114. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to improve shape rasterization through pixel alignment, a system comprising:
a pixel alignment system implemented at least partially in hardware of a computing device to:
receive at least one input specifying a geometry, a style setting, and a location of a shape that serves as a basis to position the shape in a user interface, the style setting describing a thickness of a line used to form the shape;
determine a snapped location that maintains the geometry of the shape in the user interface based on a pixel grid, the style setting, and the location, the snapped location determined as a pixel location in the pixel grid in response to definition of the line as center-aligned and the thickness of the line having an even number of pixels and the snapped location determined as a sub-pixel location in the pixel grid in response to definition of the line as center-aligned and the thickness of the line having an odd number of pixels;

snap, prior to rendering the shape, the location as specified by the at least one input to the snapped location in the user interface;

rasterize the shape as pixels based on the snapped location; and render the rasterized shape for display on a display device.

2. The system as described in claim 1, wherein the pixel alignment system is configured to permit anti-aliasing for at least a portion of the shape.

3. The system as described in claim 2, wherein the portion of the shape is covered or is not aligned along a horizontal axis or vertical axis of the pixel grid.

4. The system as described in claim 1, wherein the style setting defines whether the line used to form the shape is center-aligned, outside-aligned, or inside-aligned.

5. The system as described in claim 1, wherein the snapped location is defined to align the line used to form the shape at the pixel or sub-pixel location within the pixel grid.

6. The system as described in claim 1, wherein the location defines a center or corner as part of a center-to-corner definition or corner-to-corner definition of the shape.

7. The system as described in claim 1, wherein the snapped location is determined as the sub-pixel location.

8. The system as described in claim 7, wherein snapping the location to the snapped location snaps a corner of the shape to the sub-pixel location.

9. The system as described in claim 8, wherein two lines used to form the corner align with sub-pixel locations of the pixel grid.

10. At least one computer-readable storage media having instructions stored thereon that, responsive to execution by a computing device, causes the computing device to perform operations comprising:

receiving at least one input to create a shape, the at least one input specifying a geometry, a style setting, and a location of the shape that serves as a basis to position the shape in a user interface, the style setting describing a thickness of a line used to form the shape;

determining a snapped location that maintains the geometry of the shape in the user interface based on a pixel grid, the style setting, and the location, the snapped location determined as a pixel location in the pixel grid in response to definition of the line as center-aligned and the thickness of the line having an even number of pixels and the snapped location determined as a sub-pixel location in the pixel grid in response to definition of the line as center-aligned and the thickness of the line having an odd number of pixels;

snapping the location to the snapped location; and rasterizing the shape as pixels based on the snapped location.

11. The computer-readable storage media as described in claim 10, wherein the input specifying the geometry and the style setting is originated through user interaction with a shape creation tool of a shape creation system.

12. The computer-readable storage media as described in claim 10, wherein the style setting defines whether a line used to form the shape has a center, outside, or inside alignment.

13. The computer-readable storage media as described in claim 10, wherein the snapped location is defined to align a line used to form the shape at a pixel or sub-pixel location within the pixel grid.

14. The computer-readable storage media as described in claim 10, wherein the location defines a center or corner as part of a center-to-corner definition or corner-to-corner definition of the shape.

15. The computer-readable storage media as described in claim 10, wherein the snapped location is determined as the sub-pixel location based on the style setting of the shape.

16. The computer-readable storage media as described in claim 15, wherein the snapping further comprises snapping a center of the line to the snapped location.

17. The computer-readable storage media as described in claim 10, further comprising permitting anti-aliasing to at least one portion of the shape.

18. The computer-readable storage media as described in claim 17, wherein the at least one portion of the shape is not aligned with the pixel grid.

19. The computer-readable storage media as described in claim 10, wherein the snapping occurs prior to rendering the shape for display.

20. In a digital medium environment to improve rendering of a shape in a user interface through pixel alignment, a system comprising:

means for specifying a geometry, a style setting, and a location of a shape that serves as a basis to position the shape, the style setting describing a thickness of a line used to form the shape;

means for determining a snapped location that maintains the geometry of the shape in the user interface based on a pixel grid, the style setting and the location, the snapped location determined as a pixel location in the pixel grid in response to definition of the line as center-aligned and the thickness of the line having an even number of pixels and the snapped location determined as a sub-pixel location in the pixel grid in response to definition of the line as center-aligned and the thickness of the line having an odd number of pixels;

means for snapping the location to the snapped location in the user interface;

means for rasterizing the shape in the user interface based on the snapped location; and means for rendering the rasterized shape.

* * * * *

UNITED STATES PATENT AND TRADEMARK OFFICE
CERTIFICATE OF CORRECTION

PATENT NO. : 10,535,121 B2
APPLICATION NO. : 15/338952
DATED : January 14, 2020
INVENTOR(S) : Abhishek Singh and Vivek Agrawal Page 1 of 1

It is certified that error appears in the above-identified patent and that said Letters Patent is hereby corrected as shown below:

In the Claims

Column 16, Line 40, after "setting", insert -- , --, therefor.

Signed and Sealed this
Twenty-fourth Day of March, 2020

Andrei Iancu
*Director of the United States Patent and Trademark Office*